United States Patent

[11] 3,633,491

| [72] | Inventors | Milton S. Williams, Jr.;<br>Christian A. Eff, both of Louisville, Ky. |
|---|---|---|
| [21] | Appl. No. | 860,184 |
| [22] | Filed | Sept. 23, 1969 |
| [45] | Patented | Jan. 11, 1972 |
| [73] | Assignee | General Electric Company |

[54] DRIVE MEANS FOR A ROTISSERIE SPIT
9 Claims, 5 Drawing Figs.

[52] U.S. Cl. ........................................ 99/340,
99/421 H
[51] Int. Cl. ........................................... A47j 37/04
[50] Field of Search............................. 99/340,
339, 376, 421, 421 H, 421 HH, 421 HV, 421 P;
74/84, 112, 125.5, 415, 436, 819

[56] References Cited
UNITED STATES PATENTS

| 1,718,961 | 7/1929 | Humphrey | 99/421 HH |
| 2,795,150 | 6/1957 | Seidler | 74/436 |
| 2,854,918 | 10/1958 | Merritt | 99/421 HH X |
| 3,100,435 | 8/1963 | Mobley | 99/421 HH |
| 3,194,148 | 7/1965 | Schibley | 99/421 HH |
| 3,241,390 | 3/1966 | Kirchner | 74/84 X |
| 3,321,982 | 5/1967 | Maunus et al. | 74/84 |

Primary Examiner—William I. Price
Assistant Examiner—Arthur O. Henderson
Attorneys—Richard L. Caslin, Harry F. Manbeck, Jr., Frank L. Neuhauser, Oscar B. Waddell and Joseph B. Forman ABSTRACT: A roasting oven having means for supporting a rotisserie spit for rotary movement within the oven cavity. One wall of the oven supports a gear motor having an output shaft with a first spit connector or chuck which is adapted to be coupled with one end of a standard spit to create a constant speed turning action spit. An alternate spit carrying a food basket is adapted to be coupled with a second spit connector that is freely supported on the first spit connector. An intermittent drive gear train is connected between the output shaft and the second spit connector whereby this second connector and hence the food basket has a slow, intermittent turning action for exposing first one side and then the opposite side of the food in the basket to a radiant heating source.

INVENTORS
MILTON S. WILLIAMS, JR.
CHRISTIAN A. EFF
BY Richard L. Caslin
THEIR ATTORNEY INVENTORS
MILTON S. WILLIAMS, JR.
& CHRISTIAN A. EFF
BY Richard L. Caslin
THEIR ATTORNEY

DRIVE MEANS FOR A ROTISSERIE SPIT

BACKGROUND OF THE INVENTION

In the past it has been the usual practice in spit roasting or charcoal broiling to impale the meat on a spit and by using fork members or skewers on the spit to prevent the meat from turning with respect to the spit. Then by slowly rotating the spit in the presence of a radiant heating means it is possible to achieve uniform cooking of the food. The primary advantage of cooking meats on a rotisserie spit is that the meats baste in their own juices as they turn, plus they are cooked rapidly and uniformly. It is deemed desirable to provide a special spit having an adjustable basket for holding small servings of food such as hamburger patties, spare ribs, chicken parts and the like. However, in roasting many small food servings in a basket of a rotisserie spit it is preferable to substitute, for the slow, constant speed, turning action of a standard spit, a slow lqst motion reversible turning action for the food basket. Hence, the meat is held in a fixed position for the largest portion of a minute, and then the meat is turned over or reversed and held for a similar length of time. This hold-turn, hold-turn action is repeated until the meat is cooked to the proper degree of doneness.

The principal object of the present invention is to provide a roasting oven with a rotisserie spit that has a motor drive mechanism that is capable of providing both a constant speed turning action for a standard spit, or a lost motion or intermittent drive for an alternate spit that is capable of carrying many small food servings.

A further object of the present invention is to provide a motor drive mechanism for a rotisserie spit with either a constant turning action or an intermittent speed turning action without the use of friction clutches or manually adjustable speed change mechanisms.

A further object of the present invention is to provide a motor drive mechanism for a rotisserie spit with a first spit connector for obtaining constant rotational movement, and a second spit connector riding freely on the first spit connector and being driven by an intermittent drive mechanism for obtaining a lost motion, intermittent turning action for a spit that is coupled to the second spit connector, thereby periodically to reverse the position of the food exposed to radiation from the heating means.

A still further object of the present invention is to provide a rotisserie spit with an expansible wire enclosure or basket which may be opened to load or unload food in the basket, and it has an adjustable clamping means for clamping the food servings within the basket.

SUMMARY OF THE INVENTION

The present invention, in accordance with one form thereof, relates to a roasting oven having a rotisserie spit supported therein for rotational movement. One wall of the oven supports a gear motor fixed thereto that has an output shaft with a first spit connector for affording a constant speed drive to a spit coupled therein. A second spit connector is freely supported on the first spit connector and there is an intermittent drive mechanism connected between the output shaft and the second spit connector to provide a lost motion, intermittent turning action to an alternate spit when it is coupled to the second spit connector.

BRIEF DESCRIPTION OF THE DRAWINGS

Our invention will be better understood from the following description taken in conjunction with the accompanying drawings and its scope will be pointed out in the appended claims.

DESCRIPTION OF THE PREFERRED EMBODIMENTS

Figure 1:
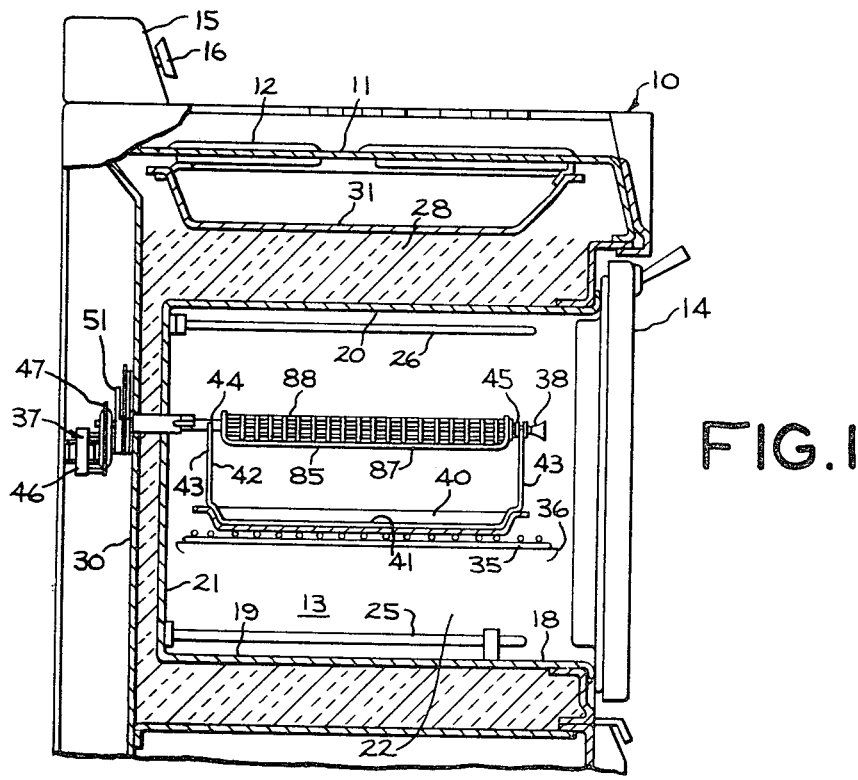
FIG. 1 is a left side elevational view of a free-standing electric range with parts broken away and others in cross section to show the interior of a roasting oven with a rotisserie spit drive mechanism embodying the present invention.

Turning now to a consideration of the drawings and in particular to FIG. 1, there is shown for illustrative purposes a free-standing electric range 10 having a top cooking surface 11 with a plurality of surface heating elements 12, an oven cavity 13, a front-opening drop-door 14 for the oven, and a backsplash 15 arranged along the back edge of the cooking surface 11 and containing a control panel in the front face thereof which includes a plurality of manually settable control devices 16 which govern the energization of the various heating elements of the range. The oven cavity 13 is formed by a boxlike oven liner 18 that has an open front that is adapted to be closed by the oven door 14 that was mentioned previously. The oven liner 18 has a bottom wall 19, top wall 20, rear wall 21 and opposite sidewalls 22, 22. As in standard electric ovens, there is a lower heating element or bake unit 25 and an upper heating element or broil unit 26. Both the bake and broil units 25 and 26 are provided with electrical terminals (not shown) that extend out through the backwall 21 of the oven liner for connection to a power circuit for the oven, as is well understood in this art. The oven liner 18 is insulated from the range body 10 by a blanket of fiber glass insulation 28 or the like completely surrounding the oven liner in order to reduce the dissipation of heat energy from the oven cavity. Metal plates or insulation guards 30 surround the bottom, the two sides and the rear of the layer of insulation 28 for supporting the insulation in place. The top of the insulation is covered with a shallow pan 31 that also serves to catch and retain any food soils that might spill or overflow through the openings in the surface heating units 12.

The oven cavity is shown provided with one oven rack 35 that is adapted to be supported on embossed ledges 36 formed on the opposite sidewalls 22, 22 of the oven liner for adjusting the position of food placed on the rack depending upon the kind and size of the food and the desired method of applying heat energy to the food whether by radiation from the upper broil element 26 or by convection currents of hot air during a baking cycle with both the bake element 25 and the broil element 26 energized. Of course, some ovens would be provided with two oven racks.

The present invention relates to a drive arrangement 37 for a rotisserie spit 38. As is more or less standard practice in this art, the rotisserie spit 38 is supported from a broil pan 40 which rests on the rack 35. Removably clipped into the front edge and the rear edge of the pan 40 is a wire frame 42 which also has a wire strip 41 that spans the bottom of the pan and is provided at each end with a vertical standard 43, 43 which has formed at its top a semicircular upturned bearing 44 for supporting the rodlike spit 38 for rotary movement. Notice in FIG. 1 that the spit 38 has a spool- or double-flanged roller 45 at its front end for receiving the bearing 44 of the standard 43 therein and restricting the in and out movement of the spit with respect to the broil pan 40.

Figure 2:
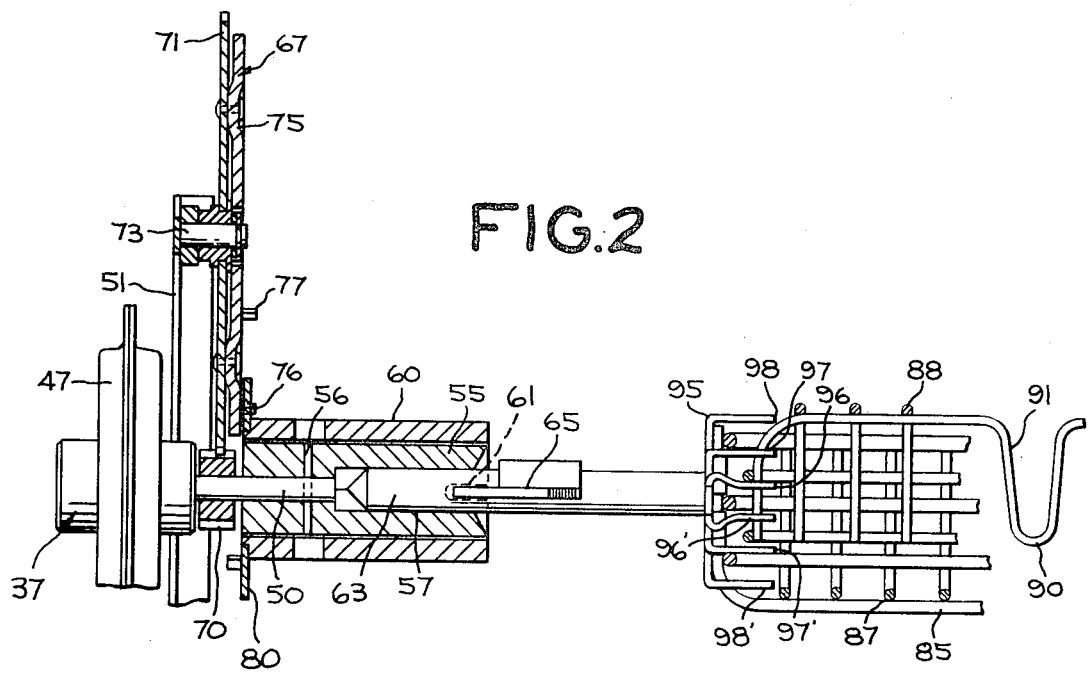
FIG. 2 is a fragmentary view on an enlarged scale taken of a portion of the motor drive mechanism of FIG. 1, and showing the coupled end of a special rotisserie spit carrying a food basket that is to be motivated by a lost motion or intermittent turning action of the present invention.

The drive arrangement 37 includes a synchronous gear motor 46 having a built-in speed reduction gearbox 47 with an output shaft 50. Fastened to the gearbox 47 is a strong mounting plate 51 which includes a pair of oppositely directed side straps 52, 52 (FIGS. 4 and 5) each having a screw opening 53 for receiving a fastening screw that attaches the assembly to the rear plate or insulation guard 30 of the range 10 as is best seen in FIG. 1. Attached to the output shaft 50 is a first spit connector or chuck 55, as is best seen in FIG. 2. A locking pin 56 extends transversely through the connector 55 and through a suitable hole in the output shaft 50. The free end of the first spit connector 55 is provided with a countersunk hexagonal socket 57 that is adapted to receive a standard rotisserie spit (not shown) having a similar hexagonal transverse cross section. The design of the rotisserie drive arrangement mentioned above is generally the standard design to which the present invention has been added.

A second spit connector or chuck 60 is freely supported on the first spit connector 55 and it has a pair of opposite slots 61, 61 formed on its free end in a diagonal plane. Looking at FIG. 3, the rotisserie spit 38 is shown with a plain cylindrical rod 63 which is adapted to be inserted into the socket 57 of the first spit connector 55. Moreover, this coupled end 63 of the spit 38 is provided with a pair of locking members or fingers 65 which are integral with the spit and are adapted to be inserted into the slots 61, 61 of the second spit connector 60. This second spit connector 60 is provided with an intermittent drive gear train 67 that drives the second spit connector 60 with a lost motion reversible turning action with an extended holding period of about 55 seconds and a short turning action of one-half a revolution in a time period of about 5 seconds. This is to be distinguished from the turning action of the first spit connector 55 which turns at a constant speed of about 6 r.p.m. or 1 revolution every 10 seconds.

This intermittent drive mechanism 67 includes a first pinion 70 (FIG. 2) fixed to the output shaft 50, and a large idler gear 1 that is enmeshed with the pinion 70. This idler gear 71 is rotatably supported on a fixed pin 73 that is riveted or otherwise fastened in the mounting plate 51. Attached to the side of the idler gear 71 that is nearest the second spit connector 60 is a gear sector 75 that comprises only two widely spaced teeth 76 and 77. These teeth or lugs 76 and 77 are not in the same plane as the sector gear, but protrude axially from the side of the gear. Positioned on the innermost end of the second spit connector 60 is a second pinion gear 80 with a series of four equally spaced radial slots 81 each for receiving one of the teeth 76 and 77 of the gear sector 75. The gear motor 37 and the speed reducing gearbox 47 has enough inertia so that it is not possible to manually turn the second spit connector 60. Thus the slots 81 of the pinion 80 will not get out of alignment with the teeth 76 and 77 of the sector gear 75.

Figure 4:
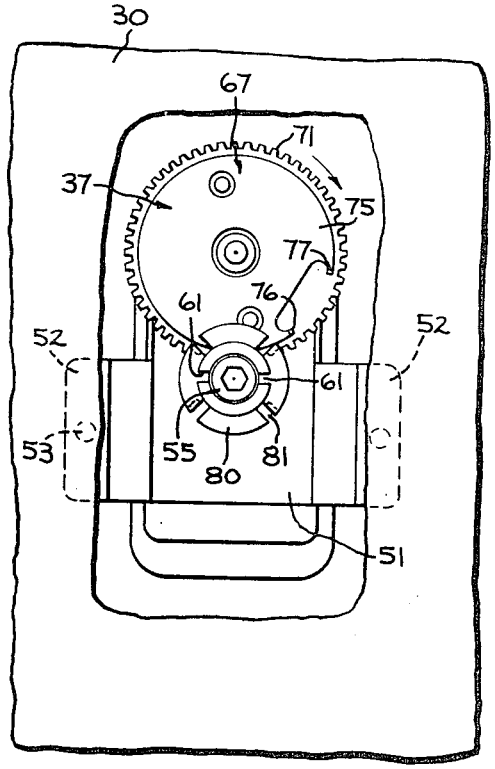
FIG. 4 is a front elevational view of the motor drive mechanism of FIGS. 2 showing the second spit connector in its stationary or lost motion position.
Figure 5:
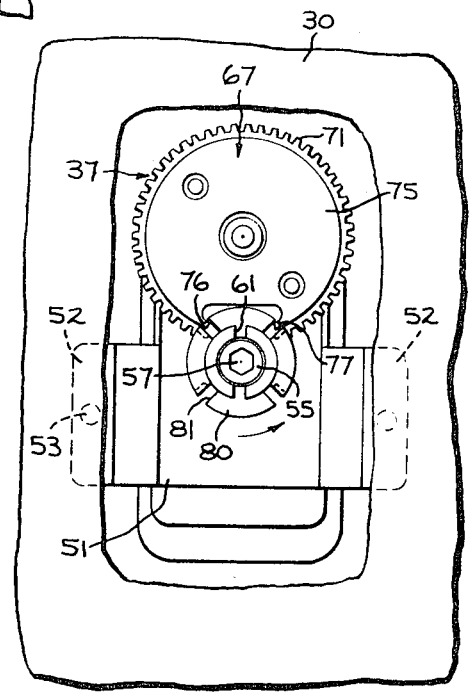
FIG. 5 is a front elevational view, similar to that of FIG. 4, showing how the intermittent drive mechanism has turned the second spit connector counterclockwise through an angle of 90°, and this turning action will continue another 90° in the same direction so that the food basket will have been turned over before undergoing another lost motion or dwell period.

Turn your attention to FIG. 4 of the drawings. You should imagine that the gear motor 37 is energized. It should be understood that the first spit connector 55 will start to rotate at a constant speed of about 6 r.p.m. in a counterclockwise direction. Of course the rate of speed is variable without departing from the present invention. The second spit connector 60 will remain stationary. Since the output shaft 50 of the gear motor is moving in a counterclockwise direction as seen in FIG. 4, the first pinion gear 70 will turn in the same counterclockwise direction thereby causing the idler gear 71 to turn at a slow speed in a clockwise direction. Eventually the first tooth 76 will approach the second pinion gear 80 and enter a slot 81 and become enmeshed therewith for a period while the second pinion gear 80 is turned in a counterclockwise direction through an angle of 90°. At this point the first tooth 76 will begin to depart from its slot 81 and simultaneously the second tooth 77 will enter the following slot 81, and in so doing will impart further counterclockwise movement of the second pinion gear 80 until this gear and hence the second spit connector 60 turns through a second 90° angle for a total of 180°. When this feat is accomplished the second tooth 77 will also depart its slot 81 of the second pinion gear 80, and the second spit connector 60 will remain fixed in place until the gear sector 75 makes almost a complete revolution and the first tooth 76 again enters the following slot 81 of the second pinion gear 80. This type of intermittent drive can be likened broadly to that of a Geneva movement although there are some operational differences peculiar to the present invention. It is impossible to turn the second spit connector 60 by hand because of the inertia of the intermittent drive gear train 67 in series with the gearbox 47. Thus the second pinion gear 80 is always in synchronism with the gear sector 75.

Figure 3:
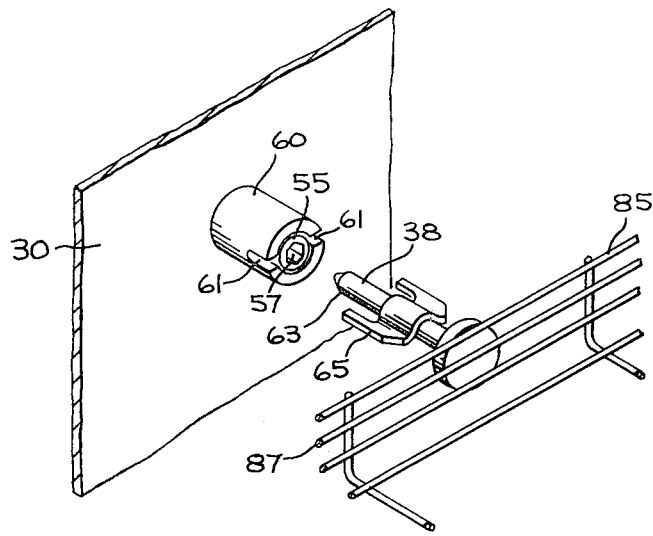
FIG. 3 is a fragmentary isometric view showing the hexagonal socket configuration of the first spit connector of the output shaft of the gear motor, and the diagonal slotted end of the second spit connector, as well as the mating end of the spit with the food basket.

Having described above our invention of a simple and foolproof intermittent drive mechanism for a rotisserie spit, it will readily be apparent to those skilled in this art that this invention incorporates the option of either driving a standard rotisserie spit at a constant speed or replacing the standard spit with an alternate spit that is coupled with the second spit connector and provided with a lost motion turning action effective periodically to reverse the surface of the food exposed to the radiant energy. This alternate rotisserie spit 38 is shown in full lines in FIG. 1 and in fragments in both FIGS. 2 and 3. The standard rotisserie spit (not shown) is in the form of a simple rodlike member frequently having a hexagonal transverse cross section. The alternate spit 38 is substantially different in that it incorporates an expansible wire enclosure or food basket 85 which is shown as a two piece basket. This basket 85 has a lower shallow pan-shaped welded wire construction 87 and a telescoping inverted shallow pan-shaped welded wire construction 88 which fits down into the bottom basket 87. As shown in FIG. 2, this top basket 88 has a central wire form 90 of generally serpentine shape fastened to the underside of the inverted top basket 88 for the length thereof. This wire form 90 has a series of widely spaced hairpin forms 91 which dip down almost to the bottom wall of the lower basket 87 so as to engage any small servings of food such as hamburger patties, chicken parts, or the like which may be sandwiched between the bottom and top baskets 87 and 88 respectively. On the longitudinal axis of the lower basket 87, rodlike ends such as 63 are fastened to the opposite end walls of the basket as is best seen in FIG. 3 such that the spit doesn't extend through the center of the basket but merely is an extension or a trunnion on the front and back portions of the basket.

Adjustable clamping means 95 are provided to clamp the two baskets 87 and 88 together at different distances from each other for accommodating food portions of different sizes. This adjustable clamping means is preferably four in number, there being a pair mounted on the front wall and a pair mounted on the backwall of the bottom basket 87. Each clamping member is a hinge member about a vertical axis, and it is furnished with a pair of offset steps such as 96, 97 and 98 on the top portion thereof and 96', 97' and 98' on the bottom portion thereof. This gives four possible adjustments of the distance between the lower basket 87 and the upper basket 88.

It should be apparent to those skilled in this art that while we have described what, at present, is considered to be the preferred embodiments of this invention in accordance with the Patent Statutes, changes may be made in the disclosed apparatus without actually departing from the true spirit and scope of this invention.

What I claim as new and desire to secure by Letters Patent of the United States is:

1. A roasting oven comprising walls defining an oven cooking cavity, rack means positioned within the oven, a pan supported on the rack, a pair of spaced standards attached to the top side of the pan and a rotisserie spit supported adjacent its opposite ends from the said standards for rotational movement with respect thereto, one wall of the oven supporting a motor drive mechanism which is adapted to be coupled with one end of the spit, said motor drive mechanism comprising an electric motor, a speed reducing gear train and an output shaft extending through an opening in said one wall, and a first constant speed spit connector supported on the said output shaft, a mounting means for supporting the mechanism adjacent the said one wall, and a second speed changing gear train cooperating with the said output shaft, and a second spit connector supported over the first said spit connector, said second gear train including a driving gear on the output shaft and an idler gear supported from the said mounting means, and a Geneva gear movement assembled between the said idler gear and the second spit connector to provide intermittent drive of one-half revolution for the second spit connector with a long dwell period between each half revolution, whereby a constant turning action may be obtained when a spit is coupled in the first spit connector while a reversible holding action may be obtained when an alternate spit is coupled in the second spit connector.

2. A roasting oven as recited in claim 1 wherein the first spit connector is in the form of a socket member having at least one flat side for mating engagement with a shaft of similar cross section, while the said first spit connector also serves as a shaft on which the said second spit connector is allowed to turn, the said second spit connector having indexing means such that an alternate spit for engagement with the second spit connector includes a spit end that is inserted into the socket of the first spit connector and is freely movable therein, said last-mentioned spit end having an indexing means cooperable with the indexing means of the second spit connector.

3. A roasting oven as recited in claim 2 wherein the said alternate spit carries a wire enclosure which may be opened to place food therein, and adjustable means for clamping the food in the wire enclosure.

4. A roasting oven having an oven cavity formed by a boxlike oven liner and a front-opening access door, heating means for cooking food placed within the oven liner, an oven rack supported from the walls of the oven liner, a pair of spaced standards supported on the oven rack, and a rotisserie spit adapted to be supported adjacent its opposite ends from the said standards for rotational movement with respect thereto, one wall of the oven liner supporting a gear motor on the outer side thereof and having an output shaft extending through an opening in said one wall, and a first spit connector fixed to the end of the output shaft, and a second spit connector freely supported on the said first spit connector, and an intermittent drive gear train connected between the output shaft and the second spit connector whereby the second spit connector has an intermittent movement comprising a series of fractional rotational movements and extended dwell periods, while the first spit connector has a constant rotational speed when the gear motor is energized.

5. A roaster oven as recited in claim 4 wherein there is a special spit for engagement with each of the two spit connectors, the spit for use with the first spit connector being of rodlike form on which the food is to be impaled, the spit for use with the second spit connector supporting an expandable wire enclosure which may be opened to place food therein, and adjustable means for clamping food within the wire enclosure.

6. A roasting oven as recited in claim 4 wherein the intermittent drive gear train comprises a driving pinion gear on the said output shaft; a speed reducing idler gear enmeshed therewith, said idler gear having associated therewith a gear sector at one side thereof, the said second spit connector having fixed thereto a driven pinion gear meshing with the said gear sector during a small fraction of the turning action of the gear sector.

7. A roaster oven having an oven cavity formed by a boxlike oven liner and a front-opening access door, radiant heating means for cooking food placed within the oven, a rotisserie spit on which food to be cooked is supported, means for supporting the spit within the oven for rotational movement, one wall of the oven liner supporting a gear motor that has an output shaft, a first spit connector fixed to the end of the output shaft for receiving one end of a rotisserie spit therein and imparting a slow constant speed turning action, and a second spit connector freely supported on the said first spit connector for receiving an alternate rotisserie spit therein and imparting a slow lost motion reversible turning action thereto, an intermittent drive gear train for controlling the movement of the second spit connector, said gear train comprising a driving gear on the said output shaft, and idler gear enmeshed therewith, said idler gear having associated therewith a gear sector at one side thereof, the said second spit connector having fixed thereto a driven pinion gear meshing with the said gear sector during a small fraction of the turning action of the gear sector.

8. A roaster oven as recited in claim 7 wherein the first spit is a rodlike member on which food is to be impaled, and the alternate rotisserie spit supports on expandable wire basket which may be opened to place food therein, and adjustable means for clamping food within the basket.

9. A roaster oven as recited in claim 8 wherein the end of the said alternate rotisserie spit that is coupled to the second spit connector has a central pin loosely fitted into the said first spit connector and a locking means that is adapted to engage with the end of the second spit connector.

* * * * *